United States Patent
Kim et al.

(10) Patent No.: US 6,743,544 B2
(45) Date of Patent: Jun. 1, 2004

(54) ELECTRIC ENERGY STORAGE DEVICE

(75) Inventors: Sung Min Kim, Yongin-si (KR); Yong Ho Jung, Daejeon (KR); Sun Wook Kim, Seoul (KR)

(73) Assignee: Ness Capacitor Co., Ltd. (KR)

( * ) Notice: Subject to any disclaimer, the term of this patent is extended or adjusted under 35 U.S.C. 154(b) by 160 days.

(21) Appl. No.: 09/840,034

(22) Filed: Apr. 24, 2001

(65) Prior Publication Data
US 2001/0036572 A1 Nov. 1, 2001

(30) Foreign Application Priority Data
Apr. 25, 2000 (KR) ........................................ 2000-21881

(51) Int. Cl.$^7$ ............................................... H01M 2/22
(52) U.S. Cl. ........................... 429/94; 429/53; 429/178; 429/180
(58) Field of Search ........................... 429/94, 53, 180, 429/178

(56) References Cited

U.S. PATENT DOCUMENTS 5,368,961 A * 11/1994 Juergens ..................... 429/233
5,370,711 A * 12/1994 Audit et al. ................ 29/623.1
6,214,490 B1 * 4/2001 Pate ............................. 429/94

OTHER PUBLICATIONS

Oberg et al., 26th Edition Machinery's Handbook, Industrial Press, Inc., 2000 p. 2483.*

\* cited by examiner

*Primary Examiner*—Carol Chaney
(74) *Attorney, Agent, or Firm*—Rabin & Berdo, PC; Philip G. Avruch

(57) ABSTRACT

An electric energy storage device for reducing electric resistance between the anode/cathode electrodes and their terminals is disclosed. In the electric energy storage device, an anode electrode and a cathode electrode are stacked to have offset areas with predetermined margins and an insulating film is inserted therebetween. And, the stacked electrodes between which the insulating film is inserted is rolled up so as to form an electrode body. A plate type anode terminal and a plate type cathode terminal which have the thread-like unevenness at their bottoms are connected to a top and bottom of the rolled electrode body respectively. A metal layer is formed on both contact areas of the anode and cathode electrodes by plasma or arc spray. The device enables to reduce the electric resistance between the electrodes and terminals by minimizing a current path in the electrodes, reduce the internal electric resistance effectively by increasing the contact areas between the electrodes and terminals because of a plurality of the thread-like unevenness formed at the bottoms of the terminals, and decrease the contact resistance therebetween by contacting the anode and cathode terminals with a metal layer formed on the anode and cathode electrodes by metal spray.

12 Claims, 9 Drawing Sheets

ELECTRIC ENERGY STORAGE DEVICE

BACKGROUND OF THE INVENTION

1. Field of the Invention

The present invention relates to an electric energy storage device, more particularly, to a capacitor of which internal electric resistance between electrodes and their terminals is greatly reduced by increasing the contact area between the electrodes and terminals using irregular interfaces.

2. Discussion of Related Art

Supplied electric energy is stored in an electric energy storage device. And, the storage device such as a battery, an electrolyte condenser, a double-layered electric condenser or the like supplies an external load with the stored electric energy for operation. When the stored electric energy is applied by the electric energy storage device to the external load, the amount of the supplied electric energy greatly depends on their own internal resistance.

Figure 1A:
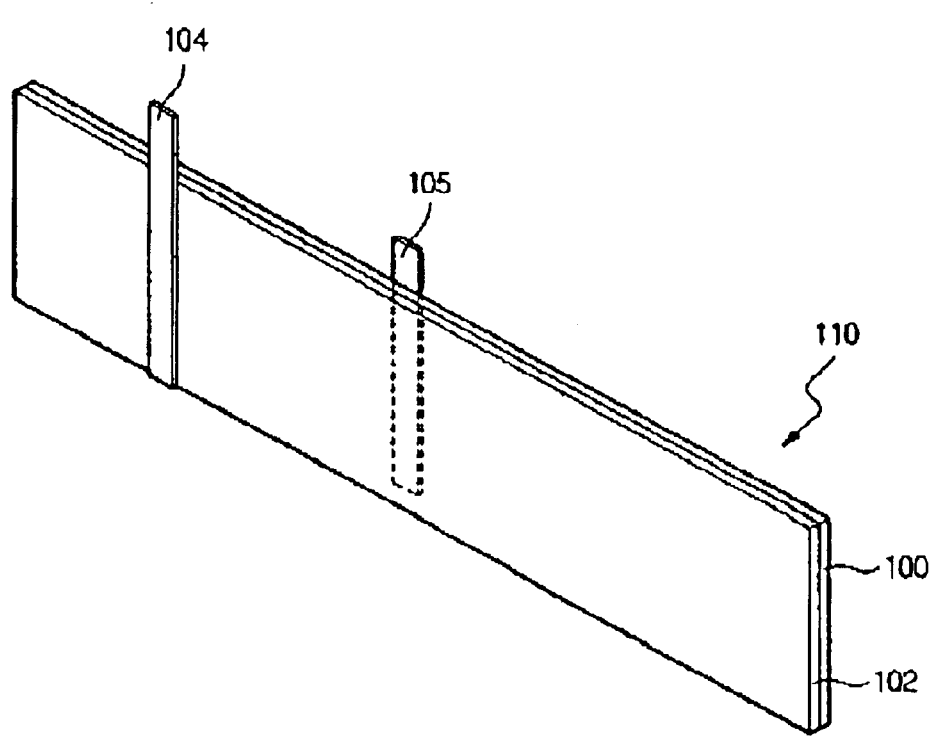
FIG. 1A shows a bird's-eye view of stacked electrodes of an electric energy storage device such as a capacitor according to a related art.

Referring to FIG. 1A, an electrode body 110 includes a film type anode electrode 100, a film type cathode electrode 102, an anode terminal 104 connected to the anode electrode 100, and a cathode terminal 106 connected to the cathode electrode 102. And, the film type anode electrode 100 and the film type cathode electrode 102 are stacked and isolated each other by an insulating film(not shown in the drawing).

The anode and cathode electrodes 100 and 102 are formed with films to store electrons. The insulating layer inserted between the electrodes 100 and 102 isolates the anode electrode 100 from the cathode electrode 102. The anode terminal 104 is connected to the anode electrode 100 by welding or riveting, and the cathode terminal 106 is also connected to the cathode electrode 102 by the same method.

Figure 1B:
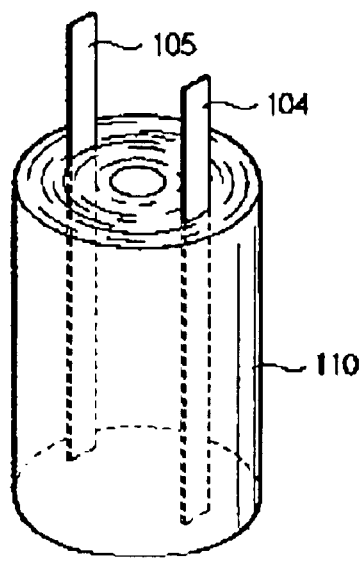
FIG. 1B shows a bird's-eye view of a cylindrical electric energy storage device by rolling the device in FIG. 1A for illustrating the stacked and rolled electrodes.

Referring to FIG. 1B, a cylindrical electric energy storage device 110 is attained by rolling up the electrode body 110 having the above structure.

The anode and cathode terminals 104 and 106 attached to the anode and cathode electrodes 100 and 102 protrude out of the electrode body 100 so as to transfer the electric energy to the external load.

Another electric energy storage device having a pair of terminals connected to a plurality of corresponding lead wires according to a related art will be explained by referring to FIG. 2A and FIG. 2B so as to reduce the internal electric resistance generated between terminals and relatively-long electrodes.

Figure 2A:
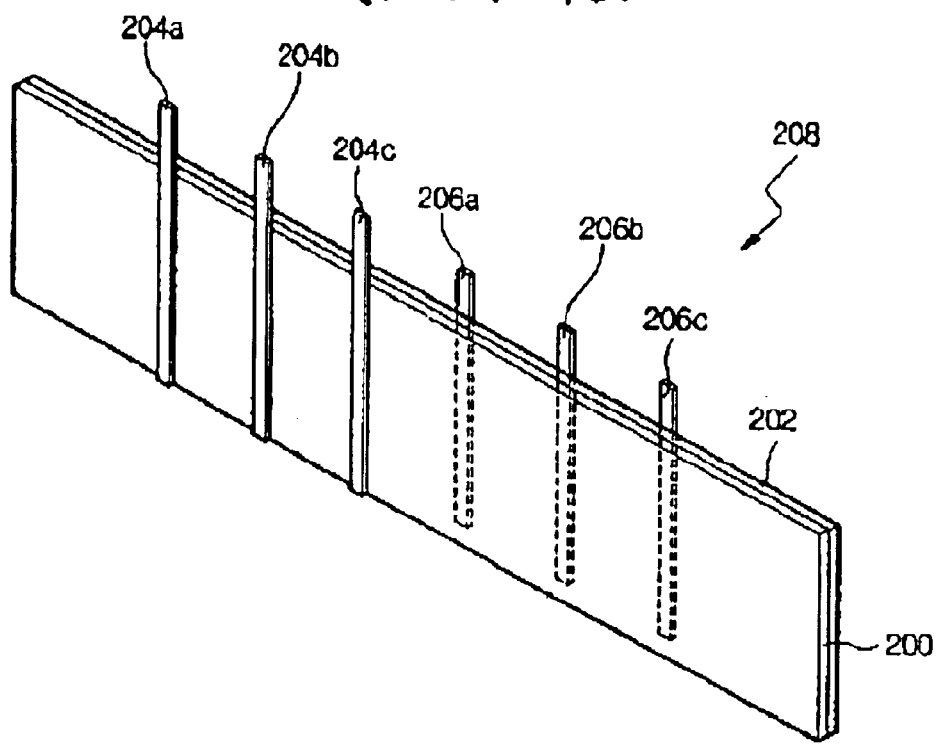
FIG. 2A shows a bird's-eye view of stacked electrodes of an electric energy storage device having a plurality of terminals according to a related art.

Referring to FIG. 2A, an electrode body 208 includes a film type anode electrode 200, a film type cathode electrode 202 stacked on the anode electrode 200, an insulating film(not shown in the drawing) inserted between the anode and cathode electrodes 200 and 202, a first to a third lead wire 204a, 204b, and 204c connected to the anode electrode 200 by welding or riveting with constant intervals apart, and a first to a third cathode lead wire 206a, 206b, and 206c connected to the cathode electrode 202 by welding or riveting with constant intervals apart. Namely, the first to third anode and cathode lead wires 204a, 204b, 204c, 206a, 206b, and 206c are separated from one another with predetermined intervals apart.

Figure 2B:
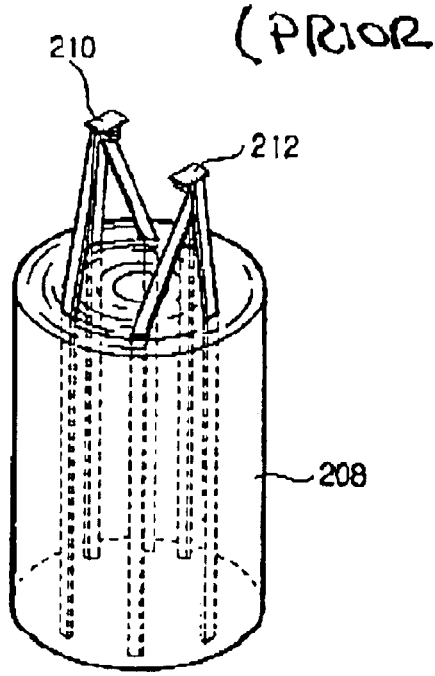
FIG. 2B shows a bird's-eye view of a cylindrical electric energy storage device by rolling the device in FIG. 2A for illustrating the stacked and rolled electrodes.

A cylindrical electric energy storage device is provided by rolling up the electrode body 208 as shown in FIG. 2B.

Referring to FIG. 2B, the first to third anode lead wires 204a, 204b, and 204c are coupled by welding all in one. Then, the welded first to third anode lead wires are connected to an anode terminal 210 by welding.

The first to third cathode lead wires 206a, 206b, and 206c are coupled by welding all in one. Then, the welded first to third cathode lead wires are connected to a cathode terminal 212 by welding.

Therefore, the first to third anode and cathode lead wires 204a/204b/204c, and 206a/206b/206c are connected to the anode and cathode terminals 210 and 212, respectively.

On the other hand, the first to third anode and cathode lead wires 204a, 204b, 204c, 206a, 206b, and 206c can be connected to the corresponding terminals 210 and 212 respectively by rivet joint as well.

Figure 3:
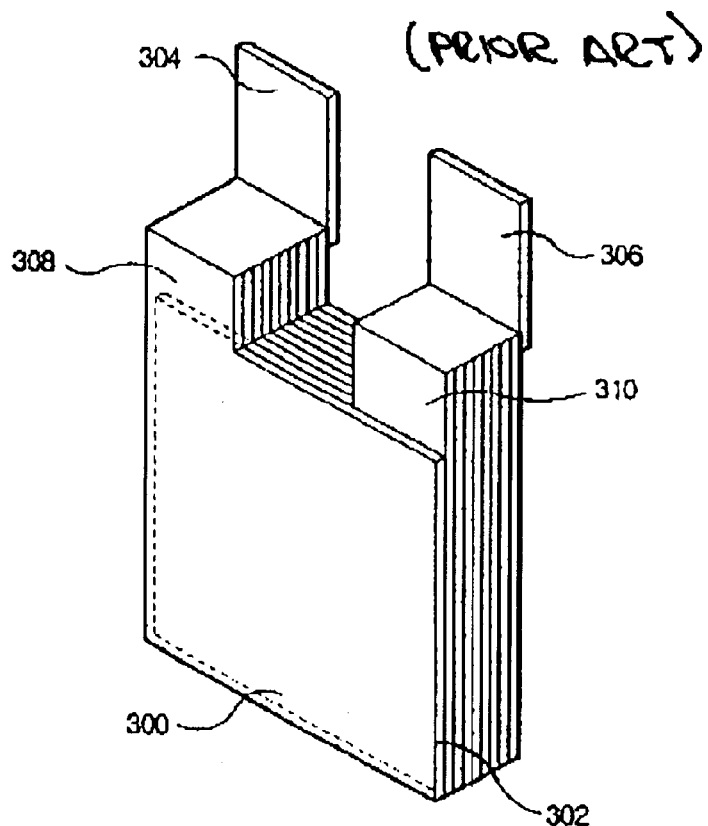

FIG. 3 shows a bird's-eye view of a regular polygon type electric energy storage devide according to a related art for illustrating terminal connections.

Referring to FIG. 3, a plurality of rectangular film type anode electrodes 300 and cathode electrodes 302 are stacked alternatively, and a plurality of insulating films(not shown in the drawing) are inserted between the anode and cathode films 300 and 302, respectively. A plurality of anode and cathode lead wires 308 and 310 are formed by extending predetermined ends of the anode and cathode electrodes 300 and 302 so as to huddle up in different corners to be coupled with an anode terminal 304 and a cathode terminal, respectively. Namely, the lead wires 308 and 310 to be connected to the corresponding terminals may be built in bodies of the electrodes 300 and 302.

In the above-structures electric energy storage device, the anode and cathode lead wires 308 and 310 of the anode and cathode electrodes 300 and 302 are connected to the anode and cathode terminals 304 and 306 by welding or riveting.

Methods of connecting a plurality of cells in an electric energy storage device by jointing anode and/or cathode terminals according to the related art will be explained as follows by referring to FIG. 4 and FIG. 5.

Figure 4:
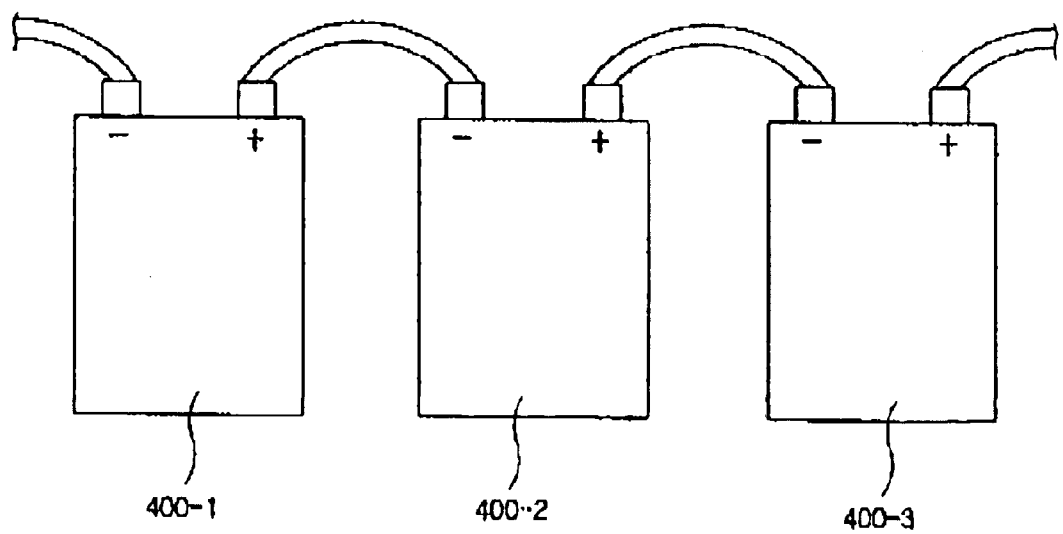
Figure 5:
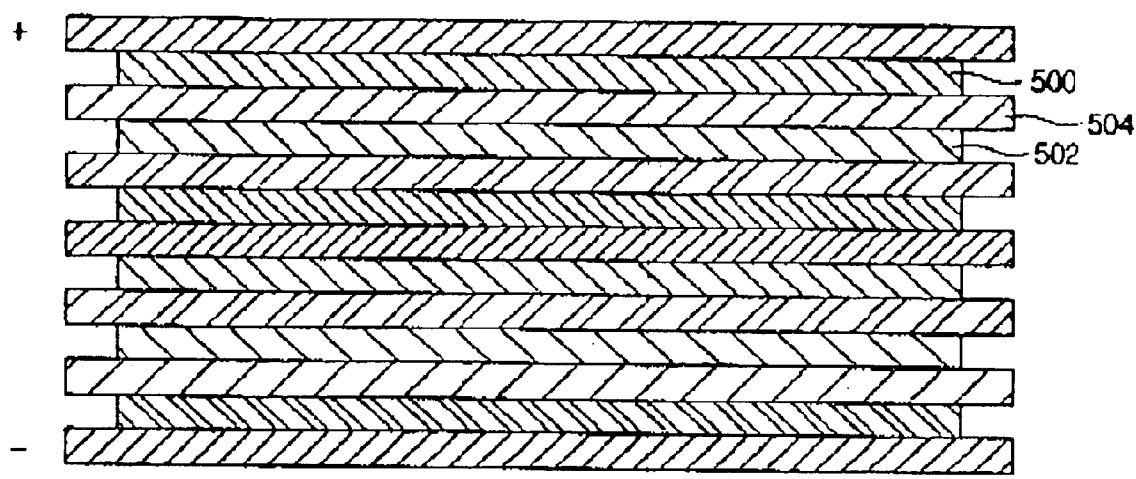

FIG. 4 shows a schematic view of an electric energy storage device using a multi-cell method according to a related art, and FIG. 5 shows a schematic view of an electric energy storage device using a bipolar method according to a related art.

Referring to FIG. 4, anode and cathode terminals + and − of a plurality of electrode bodies 400-1, 400-2, 400-3, . . . in an electric energy storage device are connected in series using lead wires 402 or plate type conductors 402.

Referring to FIG. 5, anode electrodes 500 are separated from cathode electrodes 502 by insulating layers 504 so as to connect in series a plurality of stacked electrode bodies in an electric energy storage device.

Unfortunately, the electric energy storage device according to the related art, as shown in FIG. 1a and FIG. 1b, when the anode and cathode electrodes are connected by welding or riveting a singe anode terminal and a single cathode terminal, fails to reduce electric resistance generated between the electrodes and terminals because the resistance is proportional to length and inverse proportional to the contact area.

And, in the electric energy storage device according to the related art, as shown in FIG. 2a, FIG. 2b and FIG. 3, a plurality of lead wires are connected to the anode and cathode electrodes of the electrode body to increase the contact area between the electrode body and the anode and cathode terminals by welding. And, the lead wires are again connected to the anode and cathode terminals by welding or riveting.

Thus, the electric energy storage device according to the related art may somewhat reduce the electric resistance between the electrodes and terminals due to the reduced electrode length of each terminal. Yet, the related art requires more complicated fabrication method, thereby decreasing productivity.

Moreover, the electric energy storage device according to the related art has to connect the terminals to the lead wires one by one or stack the electrode bodies one on one with insulators therebetween, when a plurality of storage cells are connected by the terminal connection of the related art,

SUMMARY OF THE INVENTION

Accordingly, the present invention is directed to an electric energy storage device that substantially obviates one or more of the problems due to limitations and disadvantages of the related art.

The object of the present invention is to provide an electric energy storage device enabling to reduce the internal electric resistance between electrodes and their terminals by improving the connections between the electrode body comprising anode and cathode electrodes and the anode/cathode terminals.

Another object of the present invention is to provide an electric energy storage device of which serial connections between a plurality of storage cells is achieved with ease.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention, which is inserted in a housing charged with an electrolyte solution, includes at least one electrode body formed by rolling up an anode electrode, a first insulating film, a cathode electrode and a second insulating film, wherein a first protrusion of the anode electrode protrudes from one end of the electrode body and a second protrusion of the cathode electrode protrudes from the other end of the electrode body and wherein the first insulating film isolates the anode electrode from the cathode electrode except the first and second protrusions, an anode terminal connected to the first protrusion of the anode electrode wherein a first contact-extending part is formed at a bottom of the anode terminal, and a cathode terminal connected to the second protrusion of the cathode electrode wherein a second contact-extending part is formed at a bottom of the cathode terminal. Preferably, the device further includes a metal layer formed on surfaces of the first and second protrusions.

Preferably, a pressure adjusting means as a rubber packing is inserted between the housing and the anode and cathode terminals so as to maintain a predetermined constant pressure between the electrode body and the anode and cathode terminals.

Preferably, inlets for injecting the electrolyte are formed at each center of the anode and cathode terminals and wherein a plurality of grooves crossing each other are formed at the bottom surfaces of the anode and cathode terminals.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the inventing and together with the description serve to explain the principle of the invention.

In the drawings:

FIG. 1A shows a bird's-eye view of stacked electrodes of an electric energy storage device such as a capacitor according to a related art;

FIG. 1B shows a bird's-eye view of a cylindrical electric energy storage device by rolling the device in FIG. 1A for illustrating the stacked and rolled electrodes;

FIG. 2A shows a bird's-eye view of stacked electrodes of an electric energy storage device having a plurality of terminals according to a related art;

FIG. 2B shows a bird's-eye view of a cylindrical electric energy storage device by rolling the device in FIG. 2A for illustrating the stacked and rolled electrodes.

Figure 6:
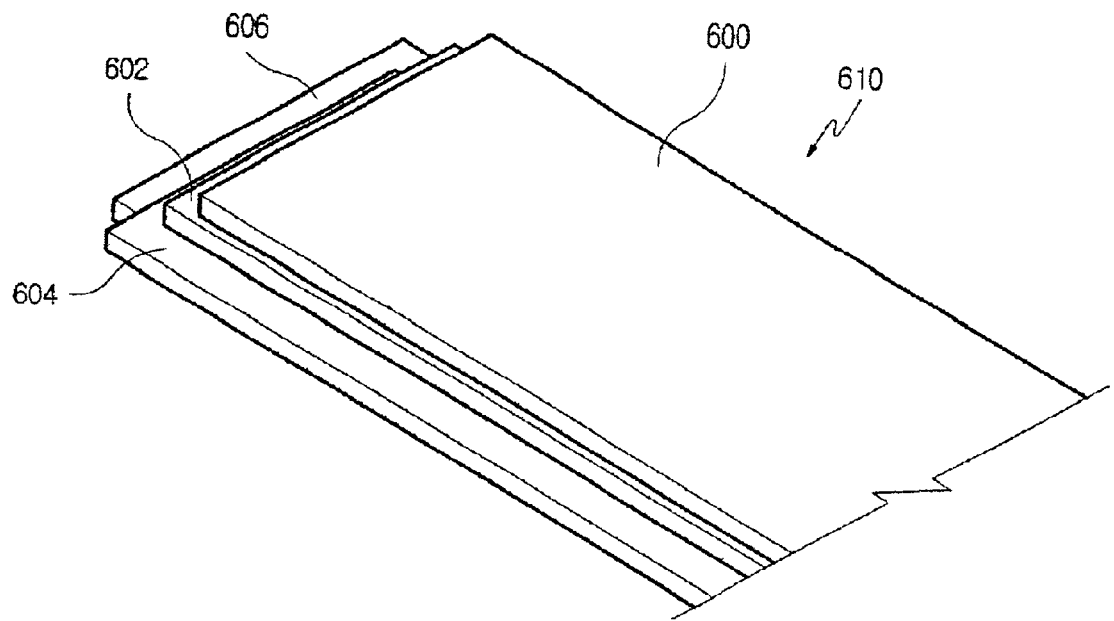
Figure 7:
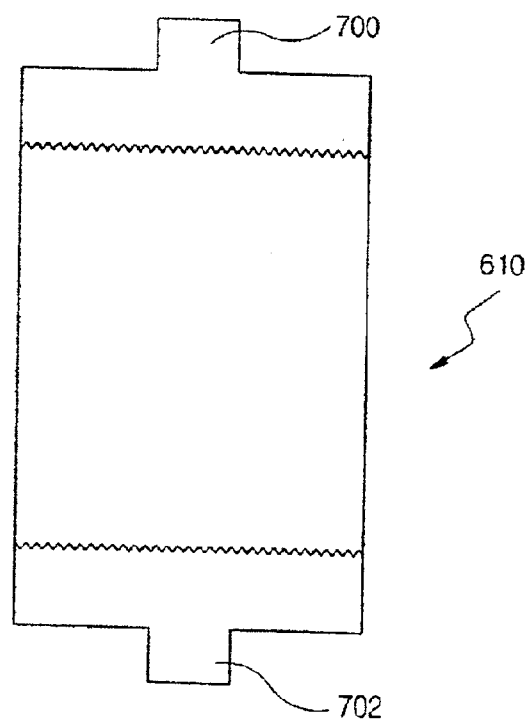
Figure 8A:
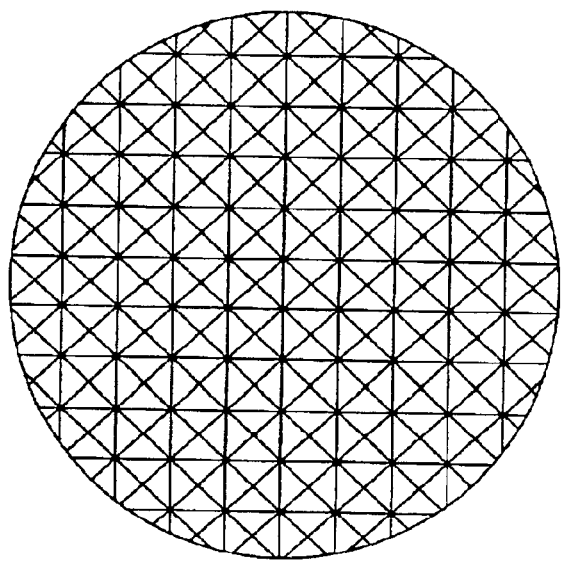
Figure 8B:
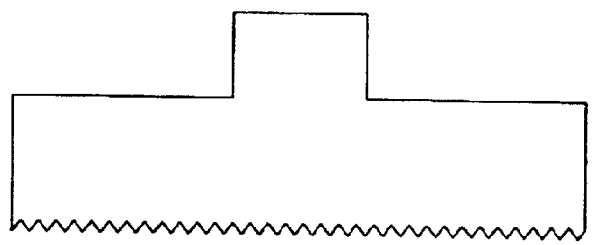
Figure 9:
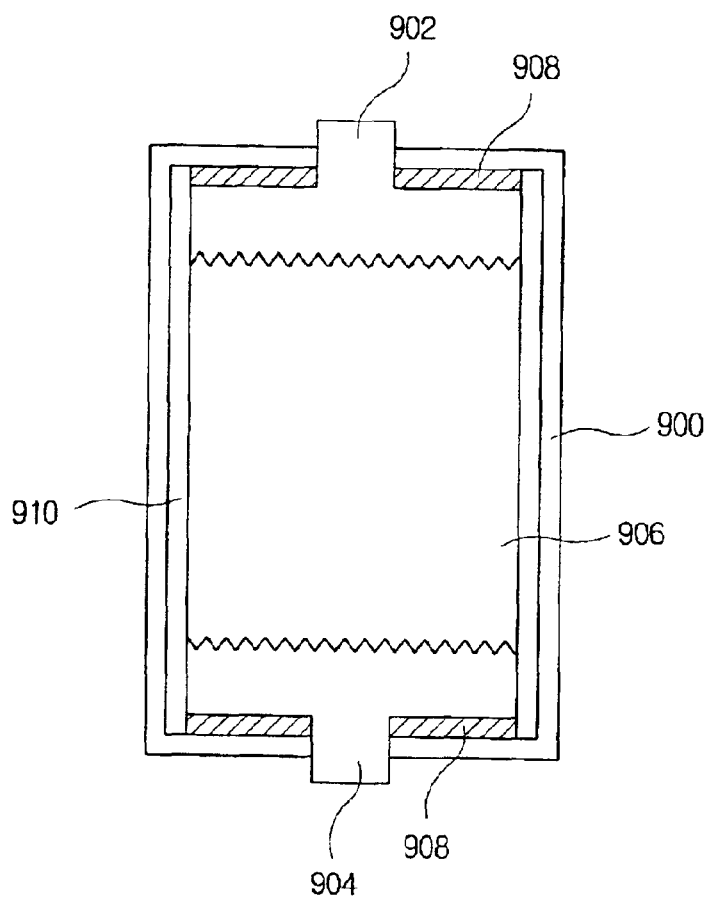
Figure 10:
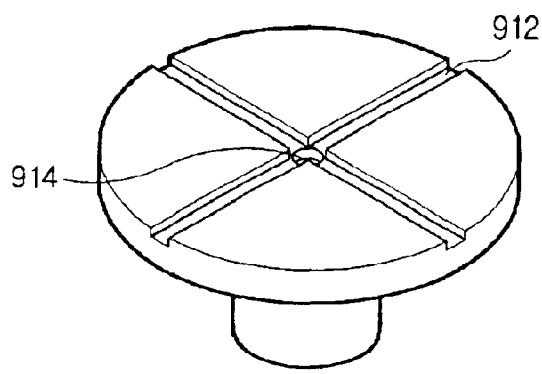
Figure 11A:
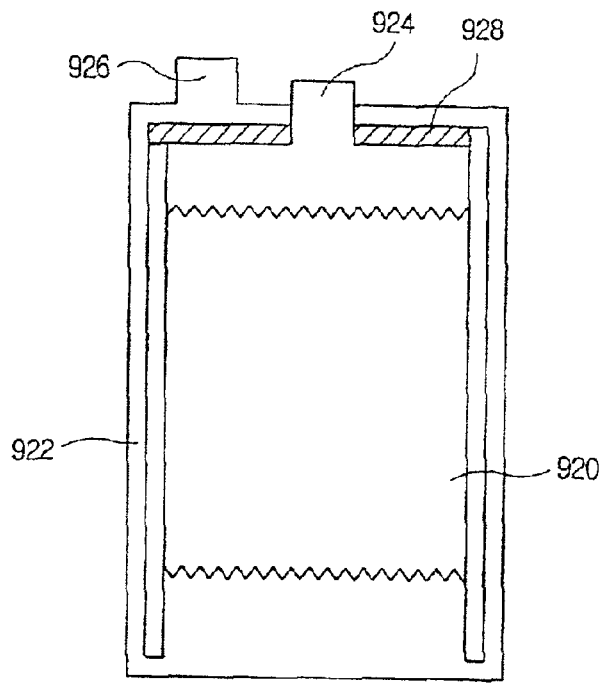
Figure 11B:
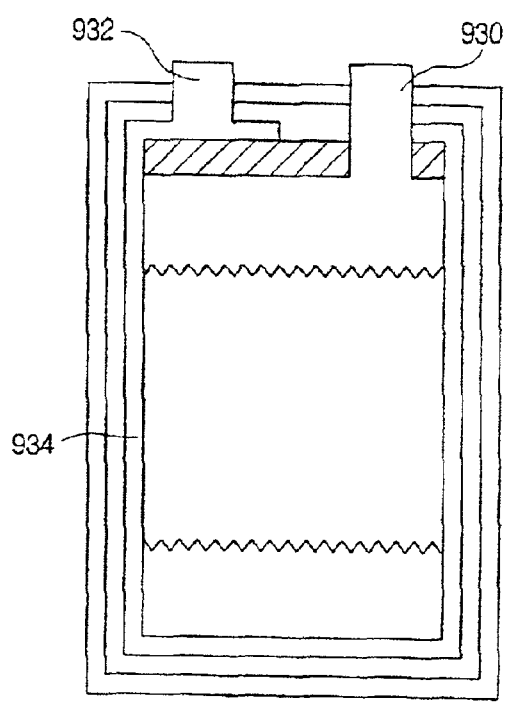
Figure 12:
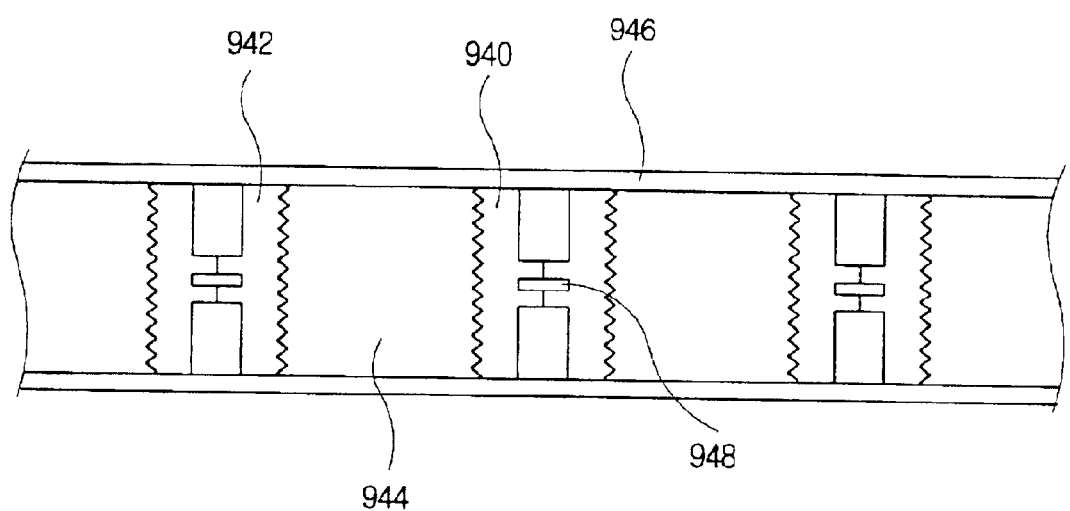

FIG. 3 shows a bird's-eye view of a regular polygon type electric energy storage devide according to a related art for illustrating terminal connections;

FIG. 4 shows a schematic view of an electric energy storage device using a multi-cell method according to a related art;

FIG. 5 shows a schematic view of an electric energy storage device using a bipolar method according to a related art;

FIG. 6 shows a bird's-eye view of stacked electrodes in an electric energy storage device according to the present invention;

FIG. 7 shows a cylindrical electric energy storage device according to the present invention;

FIG. 8A shows a bottom of a terminal in FIG. 7;

FIG. 8B shows a lateral cross-section of the terminal in FIG. 8A;

FIG. 9 shows a cross-sectional view of an electric energy storage device inserted in a housing according to the present invention;

FIG. 10 shows a lower part of a terminal having an electrolyte drift path in an electric energy storage device according to the present invention;

FIG. 11A and FIG. 11B show an electric energy storage device of which terminals are formed at the same lateral side of an electrode body according to the present invention; and FIG. 12 shows serial connections of an electric energy storage device according to the present invention.

MAJOR PARTS DESIGNATED NUMERALS

600: anode electrode
602: first insulating layer
604: cathode electrode 606: second insulating layer
610: electrode body
700: anode terminal
702: cathode terminal

DETAILED DESCRIPTION OF PREFERRED EMBODIMENTS

Reference will now be made in detail to the preferred embodiments of the present invention, examples of which are illustrated in the accompanying drawings.

FIG. 6 shows a bid's-eye view of stacked electrodes in an electric energy storage device according to the present invention, FIG. 7 shows a cylindrical electric energy storage device according to the present invention, FIG. 8A shows a bottom of a terminal in FIG. 7. and FIG. 8B shows a lateral cross-section of the terminal in FIG. 8A.

Referring to FIG. 6, an electrode body 610 includes a film type anode electrode 600, a first insulating film 602, a film type cathode electrode 604, and a second insulating film 606. In this case, the film type anode electrode 600, first insulating film 602, film type cathode electrode 604, and second insulating film 606 are all stacked in reverse order.

And, the anode electrode 600 and cathode electrode 604 are aligned to provide offset areas such that one end of the anode electrode 600 and the opposite end of the cathode electrode 604 protrude out of the electrode body 610.

Namely, the reason why the anode and cathode electrodes 600 and 604 are stacked to provide the offset areas is that an anode terminal 700 in FIG. 7 is to be contacted with one end of the anode electrode 600 and that a cathode terminal 702 in FIG. 7 does the other end of the cathode electrode 604 in the electrode body 610.

In this case, the first insulating film 602 is formed to isolate the anode cathode 600 from the cathode electrode 604 when stacking the films, while the second insulating film 606 is used for insulation between the anode and cathode electrodes 600 and 604 when rolling up the electrode body 610 to provide a roll type electrode body.

Referring to FIG. 7, the electrode body 610 is rolled up to form a roll type electric energy storage device enabling to provide high capacity. Then, an anode terminal 700 a cathode terminal 702 are connected to one end and the other end of the electrode body 610 which is rolled, respectively. In this case, the anode and cathode terminals 700 and 702 are placed over the respective ends and then pressed mechanically with a predetermined force so as to be connected to the electrode body 610.

In this case, the predetermined one end of the electrode body 610 is the offset area of the anode electrode 600 protruding out of the electrode body 610 to be connected to the anode terminal 700, while the other end of the electrode body 610 is the other offset area of the cathode electrode 404 protruding out of the electrode body 610 to be connected to the cathode terminal 702.

The anode and cathode terminals 700 and 702 contacted by the above-mentioned method will be explained in detail by referring to FIG. 8A and FIG. 8B as follows.

Referring to FIG. 8a, the anode terminal 800 has a shape of a circle enabling to cover the entire top surface of the predetermined one end of the cylindrically-rolled electrode body 610. And, the bottom of the anode terminal 700 contacted with the anode electrode 600 has an uneven surface having a shape of a plurality of screw threads. Thus, a vertical cross-sectional view of the anode terminal 700 is shown in FIG. 8b.

And, the cathode terminal 702 has the same figure of the anode terminal 700. Thus, the bottoms of the anode and cathode terminals 700 and 702 of the electric energy storage device according to the present invention have a plurality of the thread-like unevenness. Therefore, the contact areas between the anode and cathode terminals 700 and 702 and the anode and cathode electrodes 600 and 604 are increased by a plurality of the unevenness enabling to be contacted with the lateral sides of the offset areas of the rolled anode and cathode electrodes 600 and 604 even though the protruding ends of the electrode body 610 fail to be rolled up uniformly.

In this case, the anode and cathode terminals 700 and 702 may be made of the same material of the anode and cathode electrodes 600 and 604.

For instance, an anode terminal and a cathode terminal are made of Al and Cu respectively in a lithium ion battery using an Al foil having a stable characteristic on an oxidizing potential as an anode electrode and a Cu foil having a stable characteristic on a reducing potential as a cathode electrode.

In a Ni—H battery using nickel or stainless steel showing a stable characteristic in an electrolyte solution, anode and cathode terminals are made of nickel or stainless steel. Besides, the anode and cathode terminals 700 and 702 may be made of Al, stainless steel, Ni, Cu or the like considering chemical stability, cost and the like.

Moreover, in the electric energy storage device according to the present invention, the anode and cathode terminals 700 and 702 can be connected to metal layers formed by plasma or arc spray on the terminal contact areas of the anode and cathode electrodes 600 and 604 of the electrode body 610 so as to reduce resistance by increasing the contact areas between the anode and cathode terminals 700 and 702 and electrodes 600 and 604.

The electrode body 610 to which the terminals are connected by the above-described method is inserted into a housing, as shown in FIG. 9, thereby completing the electric energy storage device according to the present invention.

FIG. 9 shows a cross-sectional view of an electric energy storage device inserted in a housing according to the present invention.

Referring to FIG. 9, an electrode body 906 to which the above-mentioned anode and cathode terminals 902 and 904 are connected is installed in a housing 900 made of metal, molding resin or the like. A pressure adjusting means 908 is placed between the housing 900 and the anode and cathode terminals 902 and 904, thereby buffering the pressure applied to the electrode body 906 due to the anode and cathode terminals 902 and 904. In this case, the pressure adjusting means 908 may be made of an elastic rubber packing. And, the housing 900 is charged with an electrolyte solution 910.

When a liquid electrolyte solution 910 is used for the electric energy storage device, gases may be produced during operation. And, the contact pressure between the electrode body 906 and the anode and/or cathode terminals 902 and/or 904 may vary by the housing expansion due to the increased temperature of the device itself or the ambience. Moreover, the contact resistance between the electrode body 906 and the anode and/or cathode terminals 902 and/or 904 may vary due to long-term use.

Therefore, the above-structured electric energy storing means enables to keep the contact pressure stable between the electrode body 906 and the anode or cathode terminal 902 or 906 because the elasticity of the rubber packing as the pressure adjusting means 908 reduces the expansive force.

FIG. 10 shows a bottom of a terminal having an electrolyte drift path in an electric energy storage device according to the present invention.

Referring to FIG. 10, a pair of cross type grooves 912 are formed on a bottom of a terminal having an electrolyte drift path in an electric energy storage device.

And, a charging hole 914 for charging the housing 900 with the electrolyte solution 910 is formed at the cross-section of the grooves 912.

The above-structured electric energy storage device according to the present invention enables to carry out electrolyte charging by flowing the electrolyte into the housing through the charging hole 914 using the grooves 912 as an electrolyte drift path after the electrode body has been installed in the housing.

And, the above-structured electric energy storage device according to the present invention enables to expel the gas generated when using the device through the charging hole 914.

FIG. 11A and FIG. 11B show an electric energy storage device of which anode and cathode terminals are formed at the same lateral side(end) of an electrode body according to the present invention.

An electric energy storage device according to the present invention enables to form anode and cathode terminals at the same lateral side of an electrode body.

As shown in FIG. 11A, a thread-like unevenness is formed at a lower internal surface of a housing 922 which is contacted with a lower side of an electrode body 920. The electrode body 920 is installed in the housing 922. An anode terminal 924 as shown in FIG. 8A and FIG. 8B is connected to an upper part of the electrode body 920. Thus, a cathode terminal 926 is formed at the same direction of the anode terminal 924 on the housing 922.

Referring to FIG. 11b, an anode terminal 930 and a cathode terminal 932 are connected respectively by the terminal connection method of the present invention. Then, the cathode terminal 932 is placed at the same direction of the anode terminal 930 by connecting a lead wire 934 to the cathode terminal 932.

FIG. 12 shows serial connections of an electric energy storage device according to the present invention.

Referring to FIG. 12, a serial connection that an anode terminal 940 of an electrode body is contacted with a cathode terminal 942 of an adjacent electrode body is respectively achieved by inserting a plurality of electrode bodies 944, to each of which an anode terminal 940 and a cathode terminal 942 are connected, into a housing 946 in a line. In this case, a reactive gas is expelled to the outside of the electric energy storage device by installing anti-explosive valves 948 between the contacting anode and cathode terminals 940 and 942.

In an electric energy storage device according to the present invention, an anode electrode and a cathode electrode are stacked to have offset areas with predetermined margins and an insulating film is inserted between the anode and cathode electrodes. And, the stacked electrodes between which the insulating film is inserted is rolled up. Then, an anode terminal and a cathode terminal which have the same shape of a bottom/top of the roll type electrodes and have the thread-like unevenness are mechanically connected to a top and bottom of the rolled electrode body respectively by applying a predetermined force thereto.

Accordingly, an electric energy storage device according to the present invention enables to reduce the electric resistance between the electrodes and terminals by minimizing a current path in the electrodes.

And, an electric energy storage device according to the present invention enables to reduce the internal electric resistance effectively by increasing the contact areas between the electrodes and terminals because of a plurality of the thread-like unevenness formed at the bottoms of the terminals.

And, an electric energy storage device according to the present invention enables to reduce the contact resistance therebetween by contacting the anode and cathode terminals with a metal layer formed on the anode and cathode electrodes by metal spray.

And, an electric energy storage device according to the present invention enables to avoid the malfunction of the device due to the separation between the electrodes and terminals by keeping the contact pressure between the terminals and the electrode body since a rubber packing is inserted between the housing and the terminals.

Moreover, an electric energy storage device according to the present invention enables to improve the device efficiency by forming a charging hole and grooves at the anode and cathode terminals so as to provide easy and uniform electrolyte injection.

Furthermore, an electric energy storage device according to the present invention enables to achieve a serial connection with ease by inserting a plurality of roll type electrode bodies in a housing such that the anode electrodes are respectively contacted with the cathode electrodes by a single electrode inserted between the electrode bodies.

It will be apparent to those skilled in the art that various modifications and variations can be made in an electric energy storage device of the present invention without departing from the spirit or scope of the inventions. Thus, it is intended that the present invention cover the modifications and variations of this invention provided they come within the scope of the appended claims and equivalents.

What is claimed is:

1. An electric energy storage device inserted in a housing charged with an electrolyte solution, the device comprising:

at least one electrode formed by rolling up a stacked layer consisting of an anode electrode, a first insulating film, a cathode electrode and second insulating film, wherein a first protrusion of the anode electrode protrudes from one end of the electrode body and a second protrusion of the cathode electrode protrudes from the other end of the electrode body, and wherein the first insulating film isolates the anode electrode from the cathode electrode, except for the first and second protrusion;

an anode terminal connected to the first protrusion of the anode electrode, wherein a first contact-extending part is formed at a bottom of the anode terminal;

a cathode terminal connected to the second protrusion of the cathode electrode wherein a second contact-extending part is formed at a bottom of the cathode terminal;

a pressure adjusting means inserted between the housing and the anode and cathode terminals so as to maintain a predetermined constant pressure between the electrode body and the anode and cathode terminals; and a metal layer formed on surfaces of the first and second protrusions.

2. The device of claim 1, wherein the metal layer is formed by plasma spray or arc spray.

3. An electric energy storage device inserted in a housing charged with an electrolyte solution, the device comprising:

at least one electrode formed by rolling up a stacked layer consisting of an anode electrode, a first insulating film, a cathode electrode and second insulating film, wherein a first protrusion of the anode electrode protrudes from one end of the electrode body and a second protrusion of the cathode electrode protrudes from the other end of the electrode body, and wherein the first insulating film isolates the anode electrode from the cathode electrode, except for the first and second protrusion;

an anode terminal connected to the first protrusion of the anode electrode, wherein a first contact-extending part is formed at a bottom of the anode terminal;

a cathode terminal connected to the second protrusion of the cathode electrode wherein a second contact-extending part is formed at a bottom of the cathode terminal; and a pressure adjusting means inserted between the housing and the anode and cathode terminals so as to maintain a predetermined constant pressure between the electrode body and the anode and cathode terminals, wherein inlets for injecting the electrolyte are formed at each center of the anode and cathode terminals, and wherein a plurality of grooves crossing each other are formed on the bottom surfaces of the anode and cathode terminals to facilitate circulation of the electrolyte within the electrode body.

4. An electric energy storage device inserted in a housing charged with an electrolyte solution, the device comprising:

at least a first and a second electrode body formed by rolling up a first stacked layer consisting of a first anode electrode/first insulating film/first cathode electrode/ second insulating film, and a second stacked layer consisting of a second anode electrode/third insulating film/second cathode electrode/fourth insulating film, respectively, wherein a first protrusion of the first anode electrode protrudes from one end of the first electrode body and a second protrusion of the first cathode electrode protrudes from the other end of the first electrode body, wherein a third protrusion of the second anode electrode protrudes from one end of the second electrode body and fourth protrusion of the second cathode electrode protrudes from the other end of the second electrode body, wherein the first and third insulating films isolate the first and second anode electrodes from the first and second cathode electrodes, respectively, except for the first to fourth protrusions, and wherein the first and second electrode bodies are inserted into the housing in a line such that the second protrusion of the first electrode body is in contact with the third protrusion of the second electrode body;

an anode terminal connected to the first protrusion of the first anode electrode, wherein a first contact-extending part is formed on a bottom of the anode terminal;

a cathode terminal connected to the fourth protrusion of the second cathode electrode wherein a second contact-extending card is formed at a bottom of the cathode terminal; and a contact terminal inserted between the second protrusion of the first cathode electrode of the first electrode body and the third protrusion of the second anode electrode of the second electrode body, wherein at least an anti-explosive valve is formed at a predetermined portion of the contact terminal.

5. The device of claim 4, wherein a third and a fourth contact-extending part are formed on a top and bottom of the contact terminal in contact with the second and third protrusions, respectively.

6. The device of claim 4, wherein the second insulating film, the first cathode electrode, the first insulating film and the first anode electrode are stacked in that order, wherein the fourth insulating film, the second cathode electrode, the third insulating film, and the second anode electrode are stacked in that order, and wherein end portions of the first and second anode and cathode electrodes are stacked so as not to be overlapped.

7. The device of claim 4, wherein the anode and cathode terminals are plate-like.

8. The device of claim 4, wherein the first and second contact-extending parts are formed with a plurality of uneven parts for contact with the respective electrode bodies.

9. The device of claim 4, wherein the anode and cathode terminals are plates sufficient in size to cover the first protrusion of the first anode electrode and the fourth protrusion of the second cathode electrode, respectively.

10. The device of claim 4, further comprising a metal layer formed on surfaces on the first to fourth protrusions.

11. The device of claim 4, wherein a pressure adjusting means is inserted between the housing and the anode and cathode terminals so as to maintain a predetermined constant pressure between the first and second electrode bodies and the anode and cathode terminals.

12. The device of claim 4, wherein inlets for injecting the electrolyte are formed at each center of the anode and cathode terminals, and wherein a plurality of grooves crossing each other are formed on the bottom surfaces of the anode and cathode terminals to facilitate circulation of the electrolyte within the electrode body.

* * * * *